United States Patent
Higashino et al.

(10) Patent No.: US 7,803,482 B2
(45) Date of Patent: Sep. 28, 2010

(54) BATTERY STACK BODY WITH A PRESSING MECHANISM HAVING A HIGHEST RIGIDITY AT A PRESSING CENTER

(75) Inventors: Tatsuya Higashino, Yamato (JP); Satoshi Muramatsu, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1589 days.

(21) Appl. No.: 11/062,618

(22) Filed: Feb. 23, 2005

(65) Prior Publication Data

US 2005/0202311 A1 Sep. 15, 2005

(30) Foreign Application Priority Data

Mar. 11, 2004 (JP) ............... 2004-068870

(51) Int. Cl.
*H01M 2/00* (2006.01)
*H01M 2/10* (2006.01)
*H01M 6/42* (2006.01)

(52) U.S. Cl. ................ 429/148; 429/99; 429/156; 429/158; 429/172

(58) Field of Classification Search ............... 320/112; 429/99, 66
See application file for complete search history.

(56) References Cited

U.S. PATENT DOCUMENTS

| | | | |
|---|---|---|---|
| 5,114,807 A | | 5/1992 | Rowlette |
| 5,492,779 A | * | 2/1996 | Ronning ............... 429/120 |
| 5,558,949 A | | 9/1996 | Iwatsuki et al. |
| 6,033,800 A | * | 3/2000 | Ichiyanagi et al. ...... 429/176 |
| 2002/0012833 A1 | | 1/2002 | Gow et al. |
| 2002/0094475 A1 | * | 7/2002 | Aoyama ............... 429/99 |
| 2003/0124416 A1 | | 7/2003 | Kaneta |
| 2004/0021442 A1 | * | 2/2004 | Higashino ............. 320/112 |
| 2004/0050414 A1 | * | 3/2004 | Oogami ............... 136/249 |
| 2004/0137321 A1 | | 7/2004 | Savaria et al. |

FOREIGN PATENT DOCUMENTS

| | | |
|---|---|---|
| DE | 38 22 462 C1 | 11/1989 |
| EP | 1 278 263 A2 | 1/2003 |
| JP | 9-259859 A | 10/1997 |
| JP | 2000-67899 A | 3/2000 |
| JP | 2001-236937 A | 8/2001 |

OTHER PUBLICATIONS

Machine translation of JP 2000-067899, Kanno et al., Mar. 2000.*

* cited by examiner

*Primary Examiner*—Dah-Wei D Yuan
*Assistant Examiner*—Kwang Han
(74) *Attorney, Agent, or Firm*—Foley & Lardner LLP

(57) ABSTRACT

A battery is provided with a battery stack body including a plurality of stacks of secondary batteries in each of which electrode plates, stacked via a separator, are accommodated and sealed in an outer sheath member, with electrode terminals correspondingly connected to the electrode plates and extracted from an outer peripheral edge of the outer sheath member, a pair of plate-like members, stacked as outermost layers of the battery stack body, respectively, so as to be opposed to each other, and a pressing mechanism pressing the plurality of secondary batteries via the pair of plate-like members. At least one of the pair of plate-like members having a characteristic exhibiting a maximum rigidity at a pressing center determined based on a plurality of pressing points of the at least one of the pair of plate-like members that are pressed by the pressing mechanism.

13 Claims, 12 Drawing Sheets

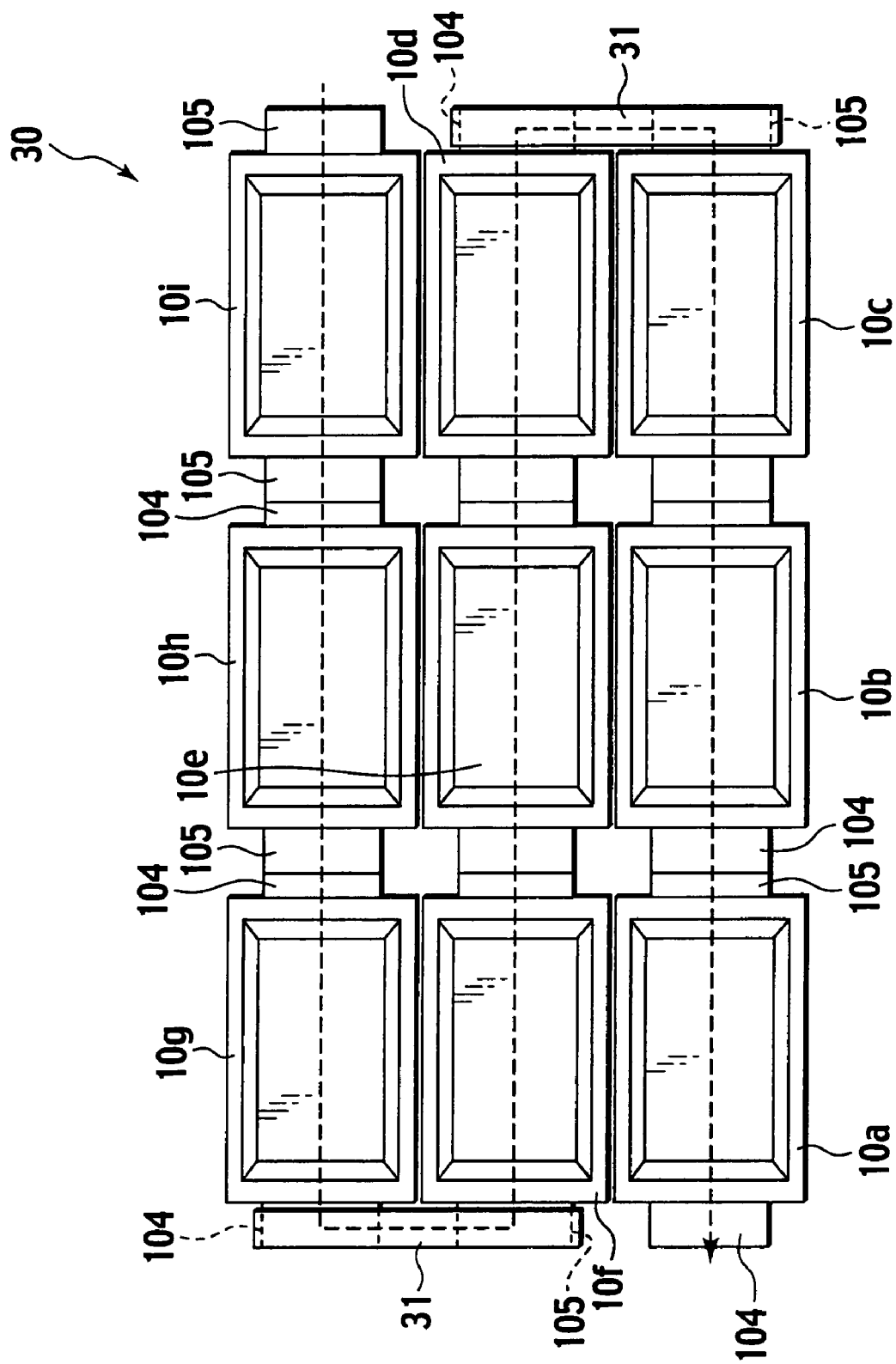

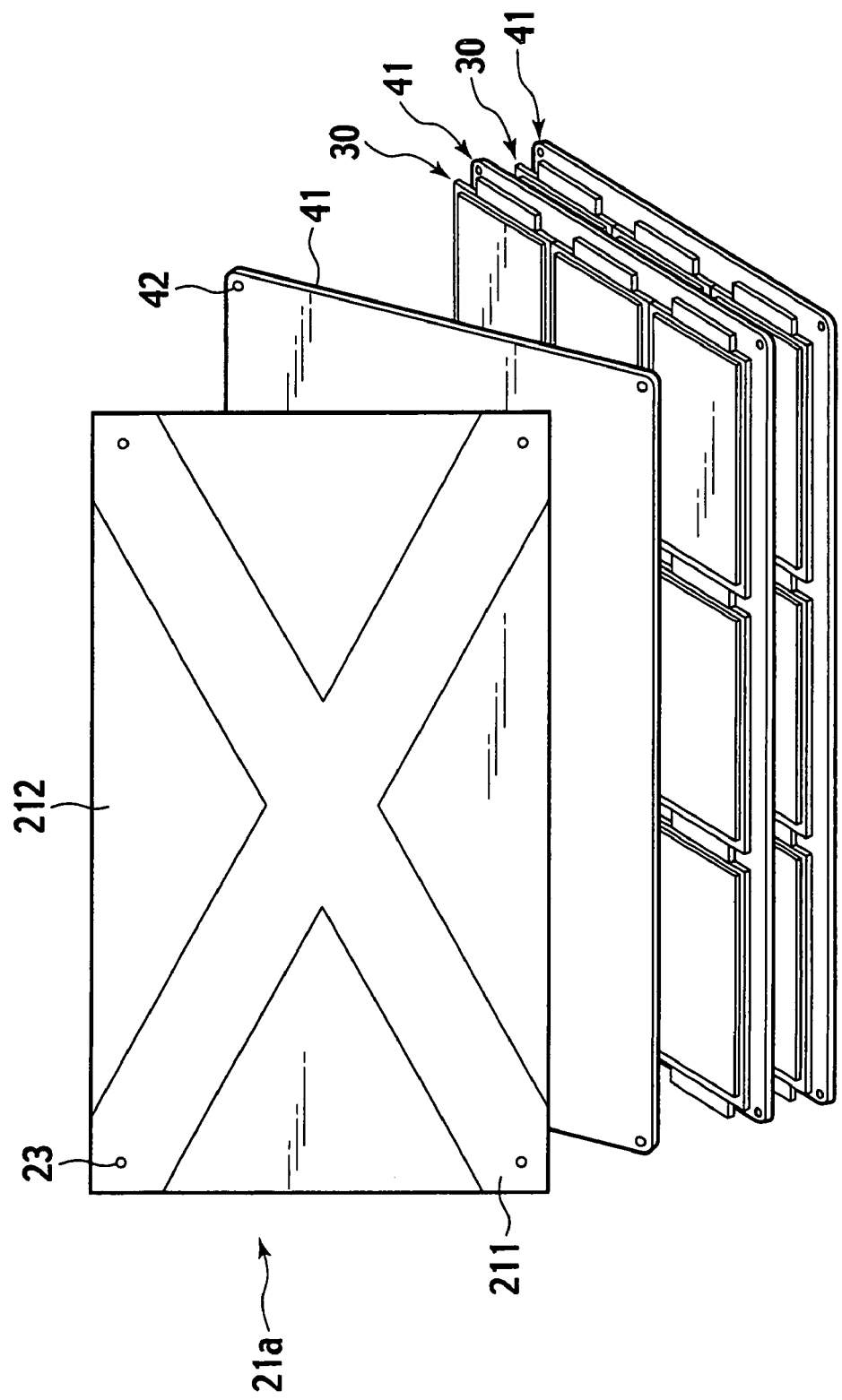

FIG.9A
FIG.9B
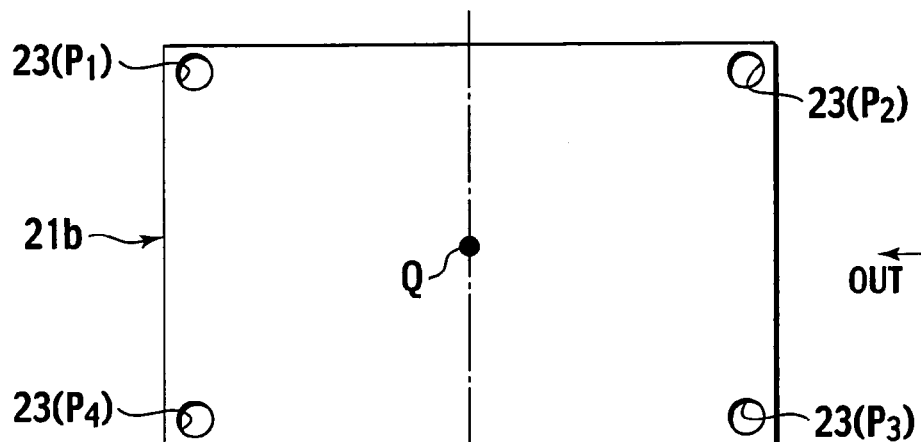
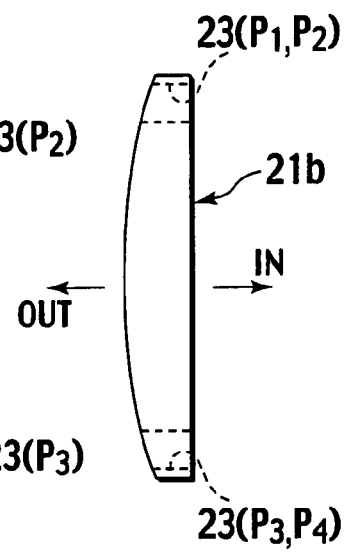
FIG.9C
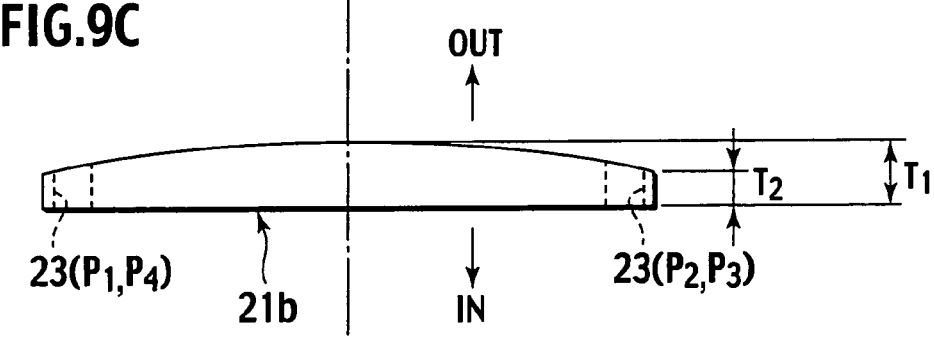
FIG.9D

BATTERY STACK BODY WITH A PRESSING MECHANISM HAVING A HIGHEST RIGIDITY AT A PRESSING CENTER

BACKGROUND OF THE INVENTION

The present invention relates to a battery and, more particularly, to a battery that is comprised with a plurality of secondary batteries connected with one another, in each of which electrode terminals are extracted from an outer peripheral edge of an outer sheath member.

Japanese Patent Application Laid-Open Publication No. 09-259859 discloses a technology wherein electrode plates are stacked via separators to form a stack body that is accommodated in an outer sheath member and a plurality of secondary batteries are stacked in a way to allow electrode terminals, connected to the electrode plates, to be extracted from an outer peripheral edge of the outer sheath member whereupon the electrode terminals, extending from the respective secondary batteries, are directly connected to by a connecting method, such as welding, to form a battery with a desired capacity and voltage.

Japanese Patent Application Laid-Open Publication No. 2001-236937 discloses a technology in which a plurality of secondary batteries are stacked to form a battery stack body and a pair of restriction plates are stacked on the uppermost and lowermost layers of the battery stack body whereupon the restriction plates are connected to one another by connecting rods to allow the plural secondary batteries to be pressed by the restriction plates.

SUMMARY OF THE INVENTION

However, upon studies conducted by the present inventors, with the battery of such a structure, in order to address a phenomenon wherein gas occurs inside the respective secondary batteries in use and accumulates between the electrode plates to cause a drop in an output voltage of the battery, a room probably exists for requirement that given pressures are applied to the respective secondary batteries in a substantially uniform manner.

Also, each restriction plate has much probability of suffering distortion due to a pressing force applied through each restriction plate when the plural secondary batteries are applied with surface pressures by the pair of restriction plates pressed by the connecting rods. The occurrence of distortion is accompanied by a surface pressure distribution pattern in which a surface pressure decreases from an outer periphery of the secondary battery to a central area thereof with the resultant difficulty in applying a uniform surface pressure to each secondary battery, causing a difficulty in reliably suppressing a voltage drop in the secondary battery.

The present invention has been completed with the above studies in mind by the present inventors and has an object to provide a battery that is able to achieve equalization of a surface pressure to be applied to each secondary battery for reliably suppressing a voltage drop in the secondary battery.

To achieve the above object, one aspect of the present invention provides a battery comprising: a battery stack body including a plurality of stacks of secondary batteries in each of which electrode plates, stacked via a separator, are accommodated and sealed in an outer sheath member, with electrode terminals correspondingly connected to the electrode plates and extracted from an outer peripheral edge of the outer sheath member; a pair of plate-like members, stacked as outermost layers of the battery stack body, respectively, so as to be opposed to each other; and a pressing mechanism pressing the plurality of secondary batteries via the pair of plate-like members, at least one of the pair of plate-like members having a characteristic exhibiting a maximum rigidity at a pressing center determined based on a plurality of pressing points of the at least one of the pair of plate-like members that are pressed by the pressing mechanism.

In other words, another aspect of the invention provides a battery comprising: a battery stack body including a plurality of stacks of secondary batteries in each of which electrode plates, stacked via a separator, are accommodated and sealed in an outer sheath member, with electrode terminals correspondingly connected to the electrode plates and extracted from an outer peripheral edge of the outer sheath member; a pair of plate-like members, stacked as outermost layers of the battery stack body, respectively, so as to be opposed to each other; pressing means for pressing the plurality of secondary batteries via the pair of plate-like members; and providing means for providing a characteristic to at least one of the pair of plate-like members such that a pressing center of the at least one of the pair of plate-like members has a maximum rigidity determined based on a plurality of pressing points of the at least one of the pair of plate-like members that are pressed by the pressing means.

Other and further features, advantages, and benefits of the present invention will become more apparent from the following description taken in conjunction with the following drawings.

BRIEF DESCRIPTION OF THE DRAWINGS

FIG. 4 is a plan view showing a sub module forming the battery of the presently filed embodiment;

FIG. 5 is an exploded perspective view of a part of the battery of the presently filed embodiment;

FIG. 9A is a plan view showing an upper end plate of a battery of a second embodiment according to the present invention;

FIG. 9B is a front view of a plate of the battery of the presently filed embodiment;

FIG. 9C is a side view of the plate of the battery of the presently filed embodiment;

FIG. 9D is a graph showing the degree (amount) "y" of flexure of the upper end plate of the battery of the presently filed embodiment;

DETAILED DESCRIPTION OF THE PREFERRED EMBODIMENTS

Figure 1:
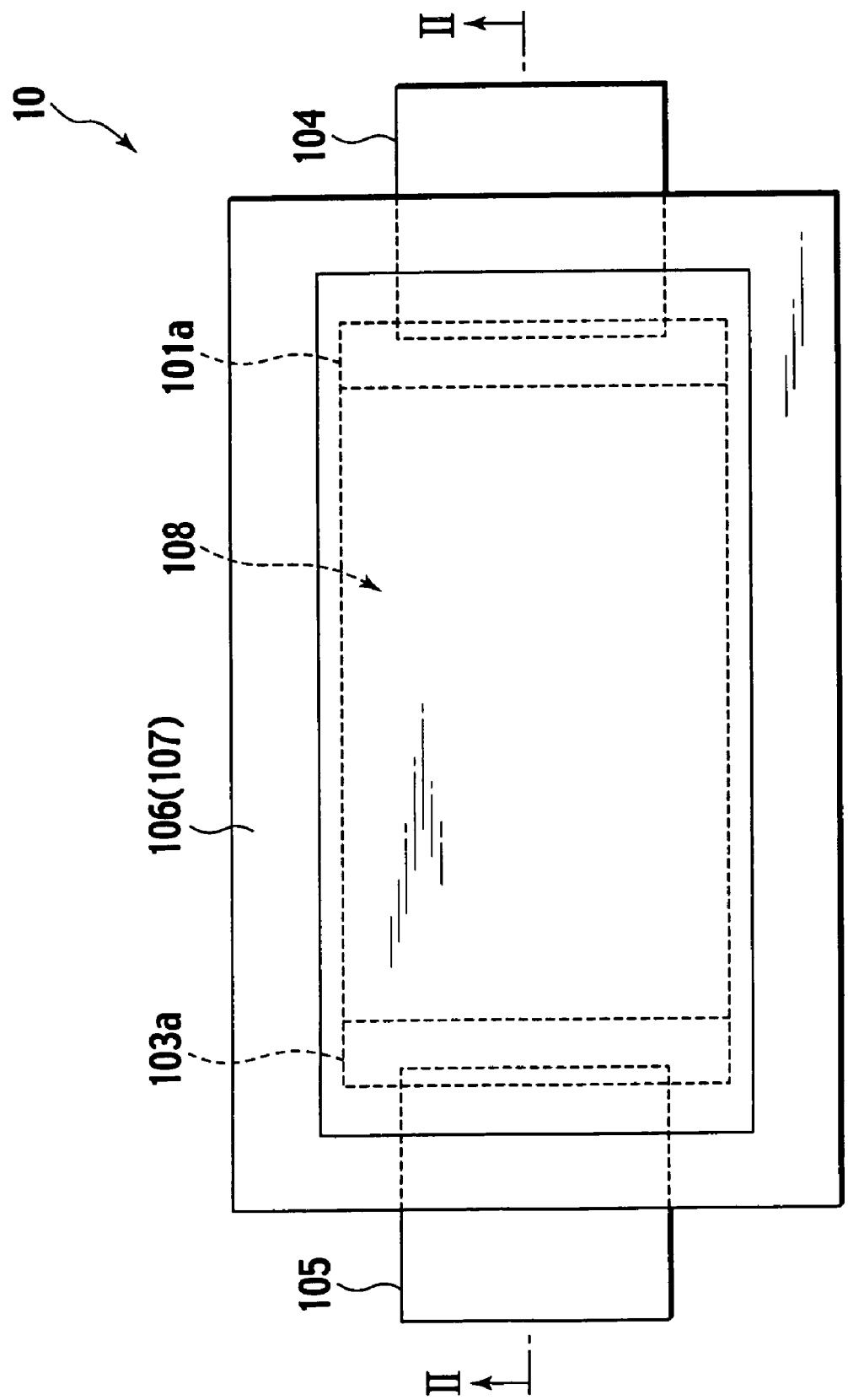
FIG. 1 is a plan view illustrating a whole of a secondary battery of a first embodiment according to the present invention.

Hereinafter, batteries of various embodiments according to the present invention are described below with reference to the accompanying drawings. Incidentally, in each embodiment according to the present invention, the same component parts bear like reference numerals while suitably omitting or simplifying description for the sake of convenience.

First Embodiment

First, a battery of a first embodiment according to the present invention is described below in detail with reference to FIGS. 1 to 8.

FIG. 1 is a plan view of a whole of a secondary battery of the presently filed embodiment; FIG. 2A is a cross-sectional view taken on line II-II of FIG. 1; and FIG. 2B is an enlarged cross-sectional view of a section IIB in FIG. 2A.

Figure 2:
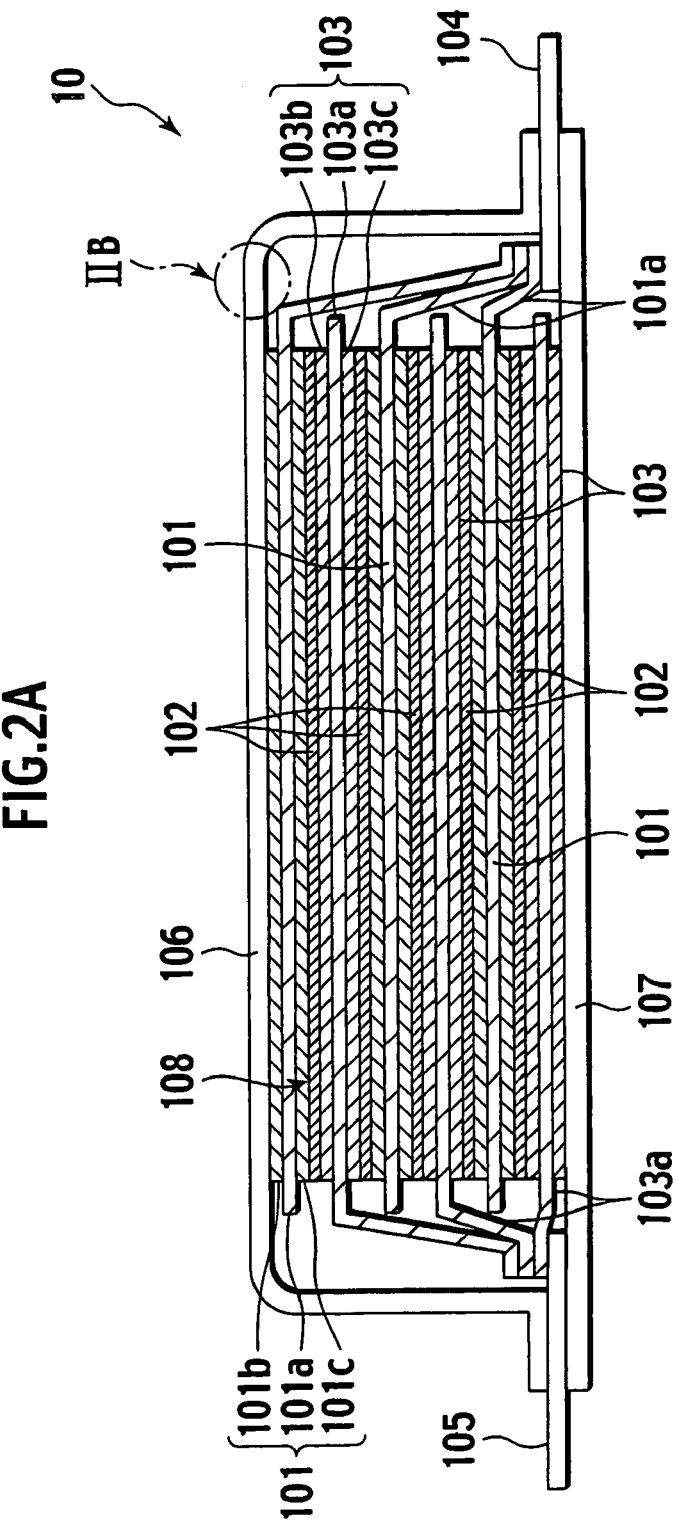
FIG. 2A is a cross-sectional view taken on line II-II of FIG. 1.
FIG. 2B is an enlarged cross-sectional view of a section IIB in FIG. 2A.

FIGS. 1 to 2B show one thin-type cell (unit cell) 10 forming a secondary battery and stacking a plurality of such thin-type cells forms a battery with a desired voltage and capacity.

More particularly, the secondary battery 10 is a flat-plate-like stack type thin battery of a lithium-family and is exemplarily comprised of three positive electrode plates 101, five separators 102, three negative electrode plates 103, a positive electrode terminal 104, a negative electrode terminal 105, an upper outer sheath member 106, a lower outer sheath member 107 and an electrolyte that is not shown. Among these, the positive electrode plate 101, the separator 102, the negative electrode plate 103 and the electrolyte are referred to as an electric power-generating element 108.

The positive electrode plate 101, forming the electric power-generating element 108, includes a positive electrode current collector 101a extending to the positive electrode plate 104, and positive electrode layers 101b, 101c formed on both main surfaces of a part of the positive electrode current collector 101a. Incidentally, the positive electrode layers 101b, 101c of the positive electrode plate 101 are not formed on entire areas of the both main surfaces of the positive electrode current collector 101a but formed in only areas to be substantially overlapped with the separators 102, respectively, when the positive electrode plate 101, the separator 102 and the negative electrode plate 103 are stacked to form the electric power-generating element 108 as shown in FIG. 2A.

The positive electrode current collector 101a of the positive electrode plate 101 includes a metallic foil, such as such as an aluminum foil, an aluminum alloy foil, a copper foil or a nickel foil, which is electrochemically stable. Further, the positive electrode layers 101b, 101c are formed by preparing a mixture of lithium composite oxides, such as lithium nickel oxide ($LiNiO_2$), lithium manganese ($LiMnO_2$) or lithium cobalt oxide ($LiCoO_2$), positive electrode active material such as chalcogen (S, Se and Te), electrically conductive material, such as carbon black, and adhesive, such as aqueous dispersion, of polytetrafluoroethylene, coating the resulting mixture onto both the main surfaces of the part of the positive electrode current collector 101a, drying the resulting layer and rolling the dried layer.

The negative electrode plate 103, forming the electric power-generating element 108, includes a negative electrode current collector 103a extending to the negative electrode plate 105, and negative electrode layers 103b, 103c formed on both main surfaces of a part of the negative electrode current collector 103a. Also, the negative electrode layers 103b, 103c are not formed on entire areas of the both main surfaces of the negative electrode current collector 103a but formed on only areas to be substantially overlapped with the separators 102 when the positive electrode plate 101, the separator 102 and the negative electrode plate 103 are stacked to form the electric power-generating element 108 as shown in FIG. 2A.

The positive electrode current collector 101a of the positive electrode plate 101 includes a metallic foil, such as an aluminum foil, an aluminum alloy foil, a copper foil or a nickel foil, which is electrochemically stable.

The negative electrode current collector 103a of the negative electrode plate 103 is formed of a metallic foil, such as the nickel foil, a silver foil, a stainless foil or an iron foil, which is electrochemically stable. Also, the negative electrode layers 103b, 103c are formed by preparing a mixture of negative electrode active material, such as amorphous carbon, hard-graphtizing carbon, graphtizing carbon and graphite, and aqueous dispersion of styrene butadiene rubber resin powder that serves as a starting material of an organic calcined body, drying the resulting mixture, pulverizing the dried mixture to obtain a principal material composed of carbon particles whose surfaces carry styrene butadiene rubber, mixing the principal material and binder such as acrylic resin emulsion, coating the resulting mixture onto the both main surfaces of the part of the negative electrode current collector 103a, drying the resulting coating layer and rolling the resulting dried layer.

Particularly, when using amorphous carbon and hard-graphtizing carbon as negative electrode active material, the secondary battery has an output voltage with a potential having a poor flatness-characteristic during charging and discharging cycles and a drop occurs in the output voltage depending on the amount of discharging. Thus, such a battery is not suited as a power supplies for communications equipments and office machineries but is advantageous as a power supply of an electric vehicle because of the absence of rapid drop in output.

The separator 102 of the electric power-generating element 108 serves to prevent the short-circuiting between the positive electrode plate 101 and the negative electrode plate 103 and may have a function to support an electrolyte. The separator 102 includes a fine porous membrane formed of polyolefin, such as polyethylene (PE) and polypropylene (PP), and also has a function to build up heat to close voids of the layer to shut off current.

Incidentally, the separator 102 may include not only a single layer membrane, such as polyolefin, but also a three-layered structure in which a polypropylene film is sandwiched by polyethylene films, and a structure in which a polyolefin fine porous membrane and an organic nonwoven fabric are stacked. Thus, by stacking the separators 102 into plural layers, the separator 102 has various functions such as a function to prevent over-current, a function to support an electrolyte and a function to maintain a shape of the separator (for improving rigidity).

With the electric power-generating element 108 of such a structure set forth above, the positive electrode plate 101 and the negative electrode plate 103 are alternately stacked. In addition, three positive electrode plates 101 are connected to the positive electrode terminal 104, made of a metallic foil, via the positive electrode current collectors 101a. In the meanwhile, the three negative electrode plates 103 are connected to the negative electrode terminal 105, similarly made of the metallic foil, via the negative electrode current collectors 103a.

Incidentally, the positive electrode plates 101, the separators 102 and the negative electrode plates 103 of the electric power-generating element 108 are not limited to a particular number of sheets set forth above and the electric power-generating element 108 may be structured even with a single sheet of positive electrode plate 101, three sheets of separators 102 and a single sheet of negative electrode plate 103 and may also be structured by selecting the numbers of the positive electrode plates, the separators and the negative electrode plates depending on needs.

Moreover, no particular limitation is intended to materials of the positive electrode terminal 104 and the negative electrode terminal 105 provided that these electrode terminals are formed of metallic materials that are electrochemically stable and examples of the positive electrode terminal 104 may include the aluminum foil, the aluminum alloy foil, the copper foil or the nickel foil like in the positive electrode current collector 101a as set forth above. Also, the negative electrode terminal 105 may include the nickel foil, the silver foil, the stainless foil or the iron foil, which is electrochemically stable, like in the negative electrode current collector 103a as set forth above.

Further, while the metal foils per se, forming the current collectors 101a, 103a of the electrode plates 101, 103, are elongated to the electrode terminals 104, 105 to allow the electrode plates 101, 103 to be directly connected to the electrode terminals 104, 105, respectively, the current collectors 101a, 103a, of the electrode plates 101, 103, and the electrode terminals 104, 105 may be connected to one another by material different from that of the metal foil forming the current collectors 101a, 103a or component parts different from the metal foil.

The electric power-generating elements 108 are accommodated in an upper outer sheath member 106 and a lower outer sheath member 107 (both of which form an outer sheath member) and sealed gastight. Regarding the upper outer sheath member 106 and the lower outer sheath member 107, as typically shown in FIG. 2B illustrating the upper outer sheath member 106, any of these component parts takes the form of a three-layered structure that includes an inner layer (synthetic resin layer) 106a, made of a resin film excellent in electrolyte-liquid-resistant property and thermal fusion property, such as polyethylene, modified polyethylene, polypropylene, modified polypropylene or ionomer, an intermediate layer (metallic layer) 106b formed of the metal foil such as aluminum, and an outer layer (synthetic resin layer) 106c formed of a resin film, excellent in electric insulating property, such as polyamide-family resin or polyester-family resin.

Accordingly, any of the upper outer sheath member 106 and the lower outer sheath member 107 is formed of flexible material such as a resin-metal thin film laminate wherein one surface (on an inner surface side of the secondary battery 10) of the metal foil, such as the aluminum foil, is laminated with resin excellent in electrolyte-liquid-resistant property and thermal fusion property, such as polyethylene and the other surface (an outer surface side of the secondary battery 10) is laminated with resin excellent in electric insulating property, such as polyamide-family resin.

Thus, by permitting the outer sheath member to include the metallic layer in addition to the resin film, the outer sheath member is enabled to have increased strength. Also, by forming the inner layer of the outer sheath member with resin excellent in thermal fusion property such as polyethylene, the outer heath is possible to have a favorable thermal fusion property with the electrode terminal made of metal, Incidentally, as shown in FIGS. 1 and 2A, the positive electrode terminal 104 is extracted outward from one end portions of the outer sheath members 106, 107 while the negative electrode terminal 105 is extracted from the other end portions and clearances occur in fused portions between the upper outer sheath member 106 and the lower sheath member 107 by thickness of the electrode terminals 104, 105. To maintain a sealing property for an inside of the secondary battery 10, seal films, formed of polyethylene and polypropylene, may be interposed in contact areas between the electrode terminals 104, 105 and the outer sheath members 106, 107. The seal films may be preferably formed of resin of the same family as that of resin that forms the outer sheath members 106, 107 for any of the positive electrode terminal 104 and the negative electrode terminal 105.

Upon using these outer sheath members 106, 107 to enclose the electric power-generating element 108s, a part of the positive electrode terminal 104 and a part of the negative electrode terminal 105, liquid electrolyte, which is made of organic liquid solvent containing a solute of lithium salts, such as lithium perchlorate, lithium tetrafluoroborate and lithium hexafluorophosphate, is poured into a space defined between the outer sheath members 106, 107 and air is drawn off from the space defined between the outer sheath members 106, 107 to form an evacuated condition, upon which outer peripheral edges of the outer sheath members 106, 107 are thermally fused by thermal pressing to provide a gastight sealing effect.

Examples of organic liquid solvent may include ester-family solvent, such as propylene carbonate (PC), ethylene carbonate (EC), dimethyl carbonate (DMC) and methyl ethyl carbonate, and the present invention is not limited to such compounds. Another example may include organic liquid solvent that include ester-family solvent, mixed with ester-family solvent, such as γ-butylactone (γ-BL) and diethoxyethane (DEE), which in intern is blended.

Hereunder, the battery 100, formed of a plurality of secondary batteries 10 with the structure set forth above, is described in detail.

Figure 3:
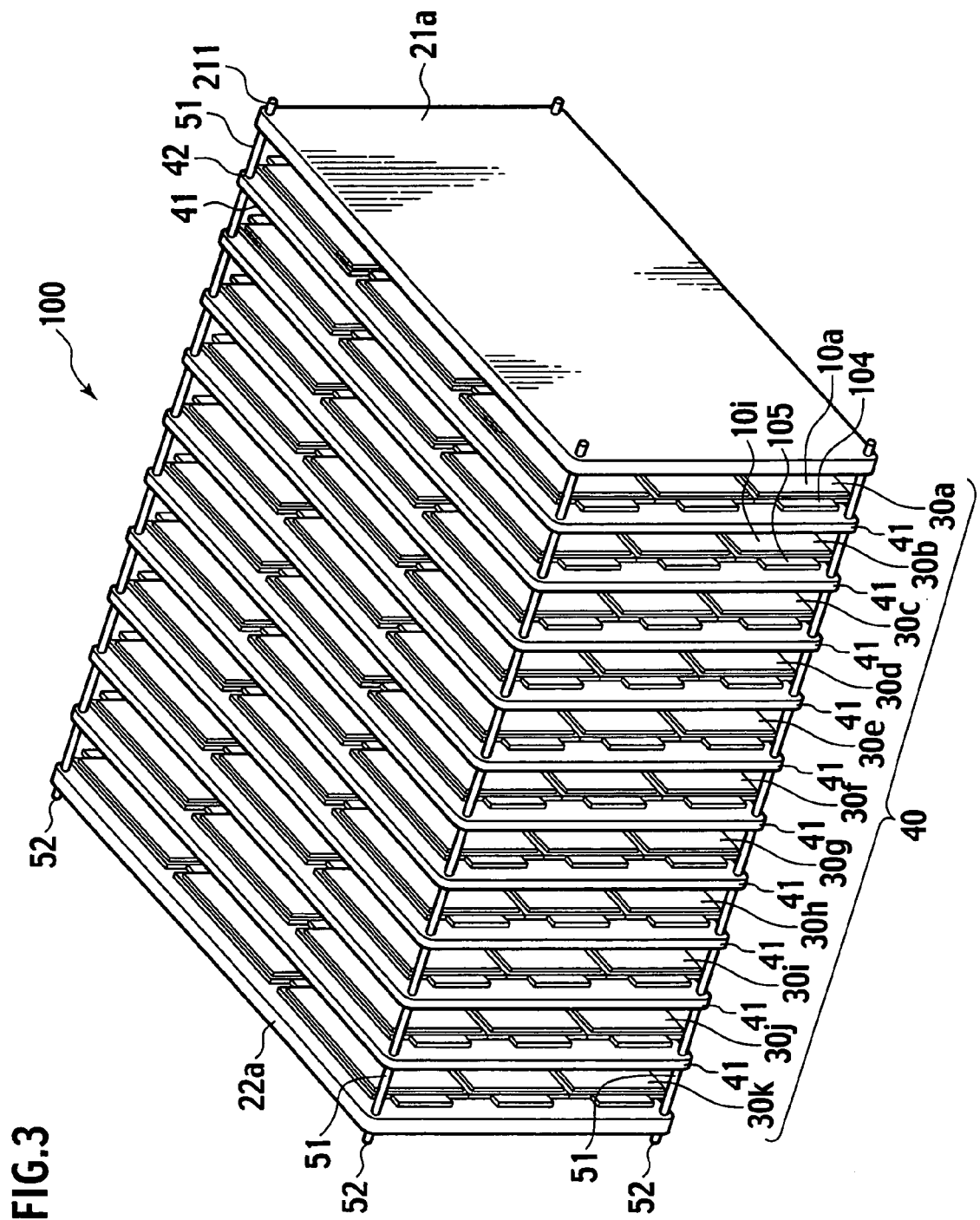
FIG. 3 is a perspective view showing a whole of a battery of the presently filed embodiment.
Figure 7A:
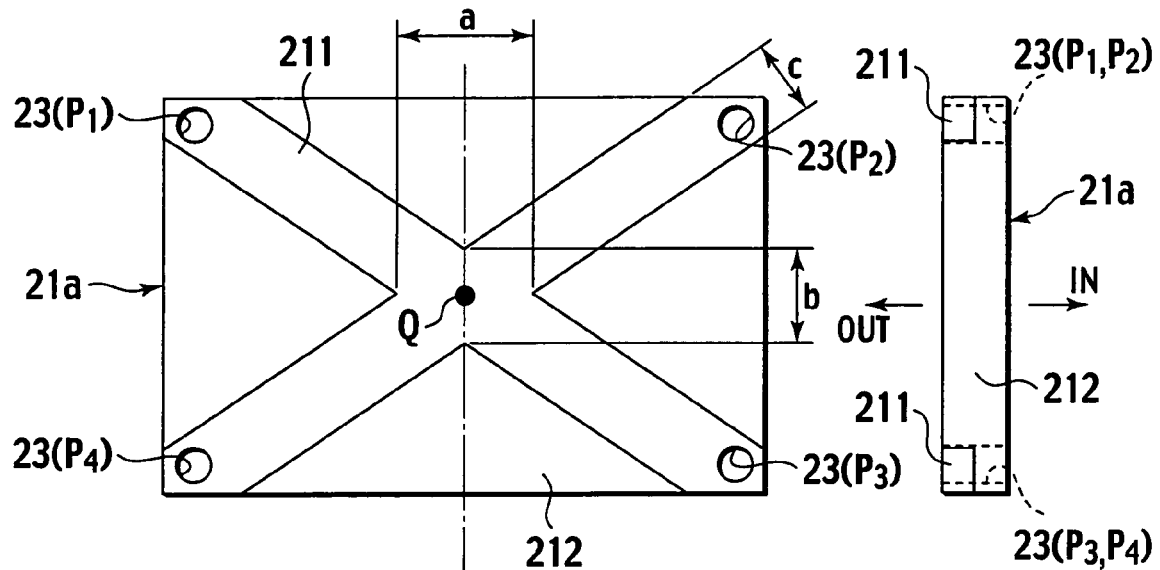
FIG. 7A is a plan view of an upper end plate of the battery of the presently filed embodiment.
Figure 7B:
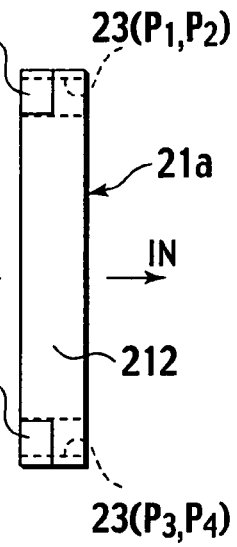
FIG. 7B is a front view of the upper end plate of the battery of the presently filed embodiment.
Figure 7C:
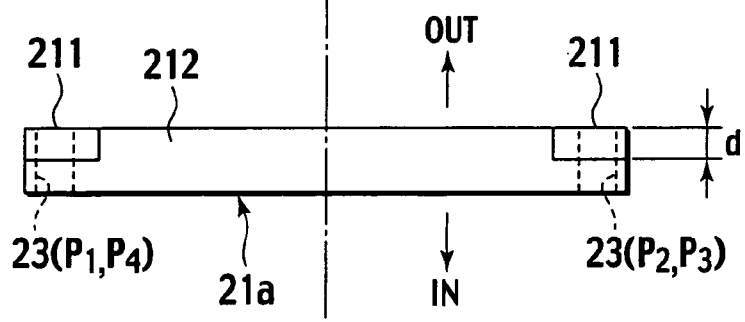
FIG. 7C is a side view of the upper end plate of the battery of the presently filed embodiment.
Figure 7D:
FIG. 7D is a graph showing the degree (amount) "y" of flexure of the upper end plate of the battery of the presently filed embodiment.
Figure 8:
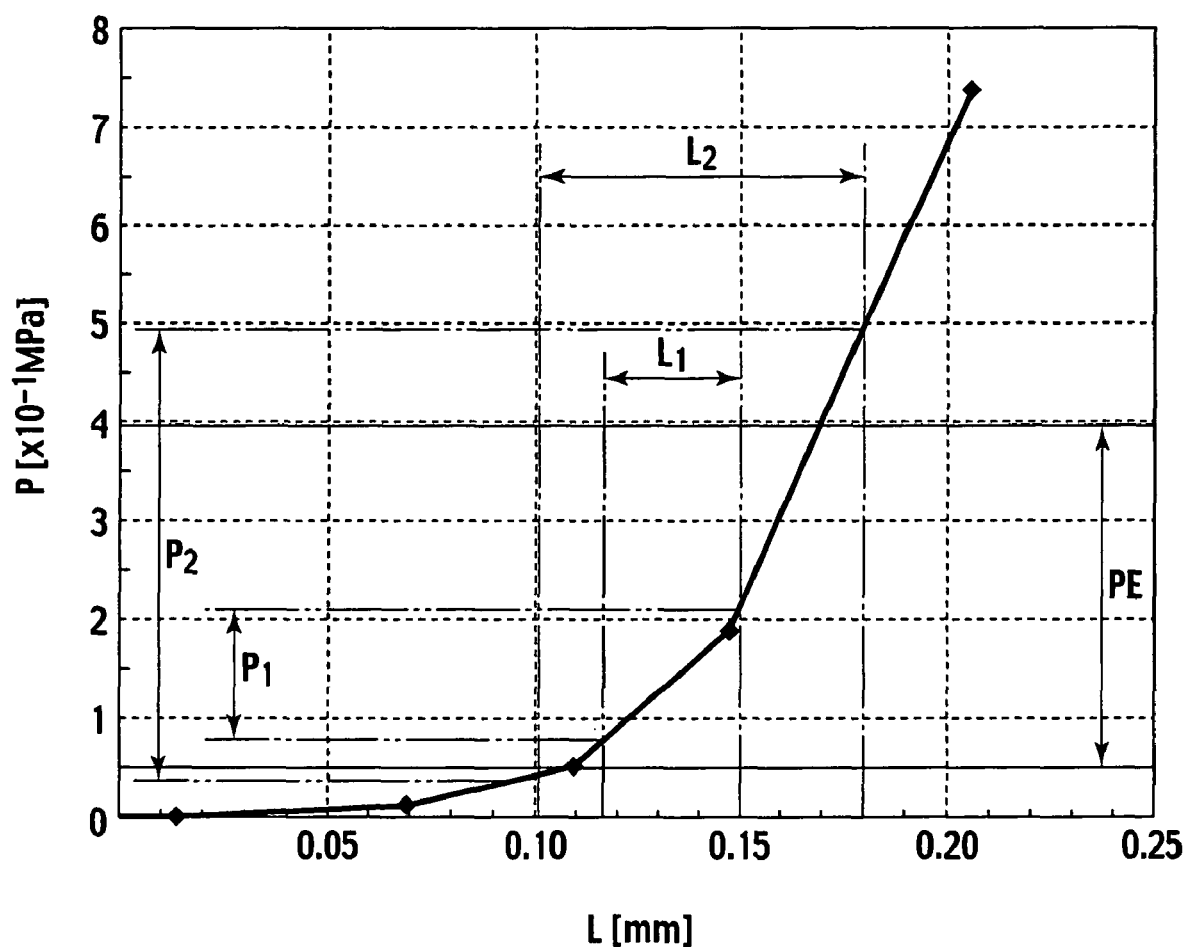
FIG. 8 is a graph for illustrating effects of the battery of the presently filed embodiment with the abscissa designating a compression margin (length) L per one secondary battery while the coordinate designates a surface pressure P.

FIG. 3 is a perspective view showing a whole of a battery of the presently filed embodiment; FIG. 4 is a plan view showing a sub module forming the battery of the presently filed embodiment; FIG. 5 is an exploded perspective view of a part of the battery of the presently filed embodiment; FIGS. 6A to 6F are typical views for illustrating examples of pressing centers in the presently filed embodiment, respectively; FIG. 7A is a plan view of an upper end plate of the battery of the presently filed embodiment; FIG. 7B is a front view of the upper end plate of the battery of the presently filed embodiment; FIG. 7C is a side view of the upper end plate of the battery of the presently filed embodiment; FIG. 7D is a graph illustrating the degree (amount) "y" of flexure of the battery of the presently filed embodiment; and FIG. 8 is a graph, for illustrating effects of the battery of the presently filed embodiment, wherein the abscissa designates a compression margin (length) L per one secondary battery and the coordinate designates a surface pressure P.

As shown in FIGS. 3 to 5, the battery 100 is comprised of a module stack body (battery stack body) 40, composed of eleven sub modules 30a to 30k, each composed of nine secondary batteries 10a to 10i, a pair of end plates (plate-like members) 21a, 22a stacked on the uppermost layer and the lowermost layer of the module stack body 40, and four sets of rods 51 and nuts 52 (both forming a pressing mechanism) through which the respective secondary batteries 10 of the module stack body 40 are pressed via the end plates 21a, 22a. Incidentally, in FIG. 3, for the sake of providing an ease of understanding a structure of the battery 100, the module stack body 40 is illustrated with spaces being broadened.

In particular, as shown in FIG. 4, each sub module 30, forming the battery 100, is comprised of nine secondary batteries 10a to 10i that are arrayed on the same plane in three lines and three rows and connected in series.

More particularly, first to third secondary batteries 10a to 10c are disposed in one row wherein the negative electrode terminal 105 of the first secondary battery 10a and the positive electrode terminal 104 of the second secondary battery 10b are connected. Likewise, the negative electrode terminal 105 of the second secondary battery 10b and the positive electrode terminal 104 of the third secondary battery 10c are connected and the first to third secondary batteries 10a to 10c are electrically connected in series. In a similar manner, fourth to sixth secondary batteries 10d to 10f are electrically connected in series and seventh to ninth secondary batteries 10g to 10i are also electrically connected in series. Further, for the sub module 30, the negative electrode terminal 104 of the third secondary battery 10c and the positive electrode terminal 105 of the fourth secondary battery 10d are connected by a bus bar 31. Likewise, the negative electrode terminal 104 of the sixth secondary battery 10f and the positive electrode terminal 105 of the seventh secondary battery 10g are connected by another bus bar 31. As a result, the first to ninth secondary batteries 10a to 10i are electrically connected in series (see broken arrow in FIG. 4). Incidentally, as for examples of techniques for connecting the electrode terminals 104 and 105 of the respective secondary batteries 10 to one another and connecting the electrode terminals 104, 105 and the bus bars 31 to one another, ultrasonic welding and cold welding may be exemplarily listed.

In the meantime, the module stack body 40 of the battery 100 is formed of eleven stacks of sub modules 30 in a structure, as set forth above, wherein as shown in FIGS. 3 and 5, the terminals 104, 105, in opposite polarity, of the adjacent sub modules 30a to 30k are oriented in the same direction, that is, the respective sub modules 30a to 30k are stacked, under a situation where the mutually adjacent sub modules 10a to 30k are rotated at 180 degrees, to allow the electrode terminals 104, 105 in opposite polarity to be connected such that the respective sub modules are electrically connected while intermediate plates 41 are interposed between adjacent sub modules 30a to 30k, respectively.

More particularly, as shown in FIG. 3, the first and second sub modules 30a, 30b are stacked under a situation where the positive electrode terminal 104 of the first secondary battery 10a and the negative electrode terminal 105 of the second secondary battery 10b are oriented in the same direction to allow the electrode terminals 104, 105 to be connected, and the intermediate plate 41 is interposed between the first and second sub modules 30a and 30b. In a similar manner, subsequently, the first to eleventh sub modules 30a to 30k are stacked and, with the battery 100 of the presently filed embodiment, a total of ninety-nine secondary batteries 10 are electrically connected in series. Incidentally, examples of technique for connecting the electrode terminals, in opposite polarity, of the respective sub modules 30 to one another exemplarily include ultrasonic welding and cold pressure welding.

The intermediate plate 41, disposed between the adjacent sub modules 30, is formed of a flat plate-like member with a larger outer shape than the sub module 30 and has rod insertion bores 42 available for inserting rods 51 at four areas in the vicinity of respective corners as shown in FIGS. 3 and 5.

Both the upper end plate 21a, stacked on the uppermost layer of the module stack body 40 of the battery 100 and the lower end plate 22a, stacked on the lowermost layer of the module stack body 40, are formed of plate-like members each with an outer shape larger in size than the sub module 30, as shown in FIGS. 3 and 5, and formed with rod insertion bores 23 at areas in the vicinity of four corners in the same concentric positions with the rod insertion bores 42 formed in the intermediate plates 41, respectively, for permitting the rods 51 to be inserted when stacked on the uppermost layer and the lowermost layer of the module stack body 40.

In order for the battery 100 to be assembled into a unitary body using the component elements as set forth above, as shown in FIGS. 3 and 5, eleven stages of sub modules 30a to 30k are stacked interposing the intermediate plates 41, respectively, to form the module stack body 40. Subsequently, the upper and lower end plates 21a, 22a are stacked on the uppermost layer and the lowermost layer of the module stack body 40, respectively. Then, the rods 51 are inserted through the respective rod insertion bores 23, 42 formed in the end plates 21a, 22a and the intermediate plates 41 and female threaded portions, formed in the nuts 52, are tightened to associated male threaded portions formed on distal ends of the respective rods 51 by given tightening forces to complete an assembly as the battery 100.

Here, by tightening the female threaded portions, formed on the rods 52, to the male threaded portions, formed on the distal ends of the rods 51, with the given tightening forces, the respective secondary batteries forming the module stack body 40 are possibly applied with given surface pressures by means of the end plates 21a, 22a. Incidentally, such pressing mechanisms are not limited to the particular structures, such as the bolts and nuts set forth above, and may take structures in the form of springs that are able to press the end plates 21a, 22a by resilient forces.

Further, the end plates 21a, 22a, for use in the battery 100, are formed of material to provide the highest rigidity at a pressing center Q ($Q_1$ to $Q_4$ in certain case) such that as typically shown in FIGS. 7A to 7D representatively designating the upper end plate 21a for the sake of convenience, the end plates 21a, 22a take the maximum rigidity at the pressing center Q, determined depending on the respective pressing points of the end plates 21a, 22a to be pressed by the rods 51 and the nuts 52.

Figure 6A:
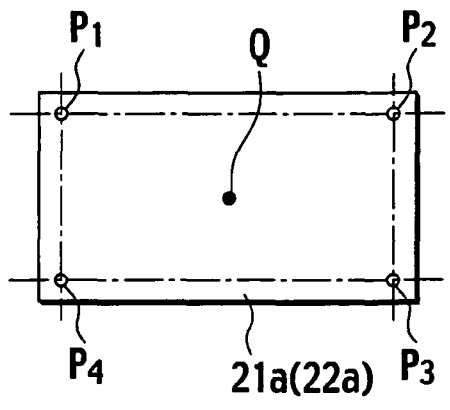
FIG. 6A to 6F are typical views for illustrating examples of pressing-point distribution patterns in the presently filed embodiment.

Here, first, describing the pressing point Q, under a situation where as in the battery 100 that has been discussed above, the end plate 21a, 22a are pressed at four points in the vicinity of the corner portions by the rods 51 to allow the pressing points $P_1$ to $P_4$ to be present at the areas in the vicinity of the corner portions, a barycentric position, induced from the pressing points P1 to P4 as shown in FIG. 6A, is determined as the pressing center Q.

Figure 6B:
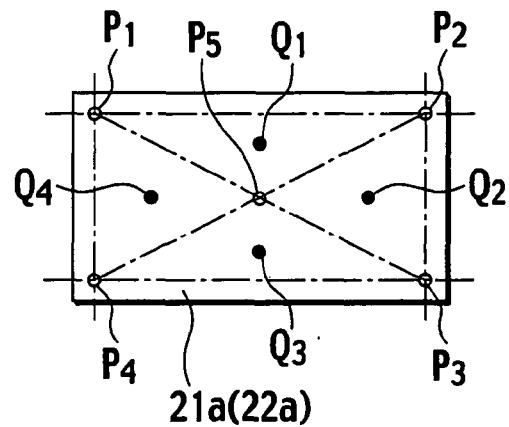

Describing the other pressing patterns, in a pressing pattern as shown in FIG. 6B where the end plates 21a, 22a are pressed at a total of five positions involving the four pressing points $P_1$ to $P_4$ in the vicinity of the respective corners of the end plates 21a, 22a and one pressing point $P_5$ in substantially central portions of the end plates 21a, 22a, that is, under a situation where even the substantially central portions of the end plates 21a, 22a are additionally pressed, first, a barycentric position, induced from the first, second and fifth pressing points $P_1$, $P_2$ and $P_5$, is set to be a first pressing center $Q_1$. In a similar manner, a barycentric position, induced from the second, third and fifth pressing points $P_2$, $P_3$ and $P_5$, is set to be a second pressing center $Q_2$. Further, a barycentric position, induced from the third, fourth and fifth pressing points $P_3$, $P_4$ and $P_5$, is set to be a third pressing center $Q_3$. Furthermore, a barycentric position, induced from the first, fourth and fifth pressing points $P_1$, $P_4$ and $P_5$, is set to be a fourth pressing center $Q_4$. Thus, a total of four pressing centers $Q_1$ to $Q_4$ are set.

Figure 6C:
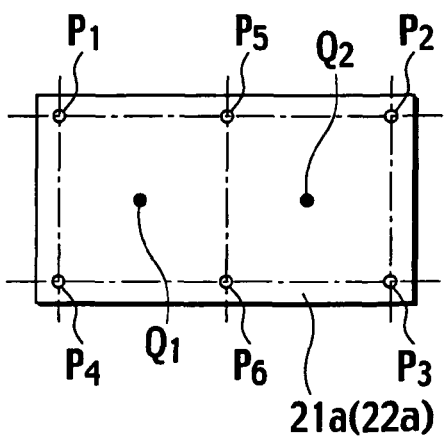

Further, as shown in FIG. 6C, in a pressing pattern where the end plates 21a, 22a are pressed at a total of six positions involving four pressing points $P_1$ to $P_4$ in the vicinity of the respective corners of the end plates 21a, 22a, a fifth pressing point $P_5$ in a substantially central portion of the end plates 21a, 22a and a sixth pressing point $P_6$ in a substantially central portion of the end plates 21a, 22a, that is, under a situation where additional pressing is executed by the rods even at the substantially central portions of the respective long sides of the end plates 21a, 22a, first, a barycentric position, induced from the first, fifth, sixth and fourth pressing points $P_1$, $P_5$, $P_6$ and $P_4$, is set to be the first pressing center $Q_1$. Also, a barycentric position, induced from the fifth, second, third and sixth pressing points $P_5$, $P_2$, $P_3$ and $P_6$, is set to be the second pressing center $Q_2$.

Figure 6D:
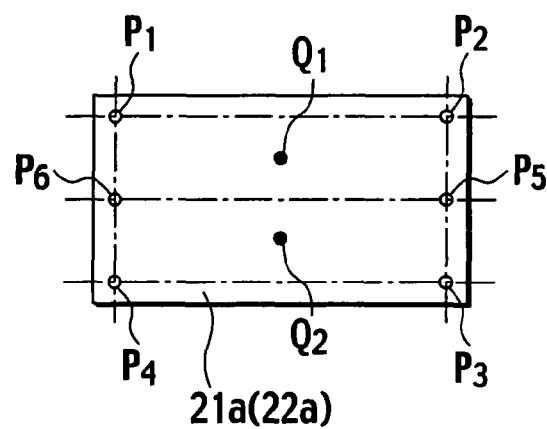

Furthermore, as shown in FIG. 6D, in a pressing pattern where the end plates 21a, 22a are pressed at a total of six positions involving four pressing points $P_1$ to $P_4$ in the vicinity of the respective corners of the end plates 21a, 22a, the fifth pressing point $P_5$ in a substantially central portion between the second pressing point $P_2$ and the third pressing point $P_3$, and the sixth pressing point $P_6$ in a substantially central portion between the fourth pressing point $P_4$ and the first pressing point $P_1$, that is, under a situation where additional pressing is executed by the rods even in the substantially central portions of respective short sides of the end plates 21a, 22a as shown in the same drawing figure, first, a barycentric position, induced from the first, second, fifth and sixth pressing points $P_1$, $P_2$, $P_5$ and $P_6$, is set to be the first pressing center $Q_1$. Also, a barycentric position, induced from the fifth, third, fourth and sixth pressing points $P_5$, $P_3$, $P_4$ and $P_6$, is set to be the second pressing center $Q_2$.

Figure 6E:
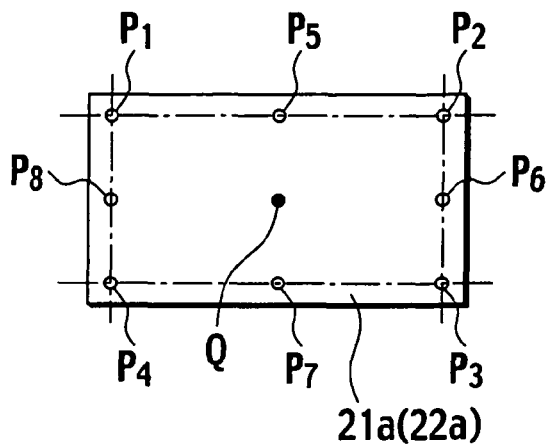

Moreover, as shown in FIG. 6E, in a pressing pattern where the end plates 21a, 22a are pressed at a total of eighth positions involving four pressing points $P_1$ to $P_4$ in the vicinity of the respective corners of the end plates 21a, 22a and the fifth to eighth pressing points $P_5$ to $P_8$ in the substantially central portions of the respective pressing points $P_1$ to $P_4$, a barycentric position, induced from the pressing points $P_1$ to $P_8$, is set to be the pressing center Q.

Figure 6F:
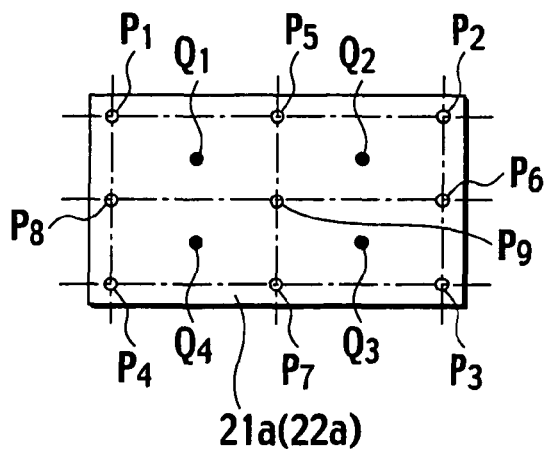

In addition, as shown in FIG. 6F, in a pressing pattern where the end plates 21a, 22a are pressed at a total of ninth positions involving four pressing points $P_1$ to $P_4$ in the vicinity of the respective corners of the end plates 21a, 22a, the fifth to eighth pressing points $P_5$ to $P_8$ in the substantially central portions of the respective pressing points $P_1$ to $P_4$, and a ninth pressing point $P_9$ in the substantially center portions of the end plates 21a, 22a, as shown in the same drawing figure, a barycentric position, induced from the first, fifth, ninth and eighth pressing points $P_1$, $P_5$, $P_9$ and $P_8$, is set to be the first pressing center $Q_1$. In a similar manner, a barycentric position, induced from the fifth, second, sixth and ninth pressing points $P_5$, $P_2$, $P_6$ and $P_9$, is set to be the second pressing center $Q_2$. Moreover, a barycentric position, induced from the sixth, third, seventh and ninth pressing points $P_6$, $P_3$, $P_7$ and $P_9$, is set to be the third pressing center $Q_3$ and a barycentric position, induced from the seventh, fourth, eighth and ninth pressing points $P_7$, $P_4$, $P_8$ and $P_9$, is set to be a fourth pressing center $Q_4$.

Incidentally, in any of the pressing patterns set forth above, the respective pressing points P ($P_1$ to $P_9$) are substantially coincident with the positions in which the respective rod insertion bores 23 are formed in the end plates 21a, 22a.

In addition, the upper end plate 22a of the presently filed embodiment is structured to have the maximum rigidity at the pressing center Q determined based on the first to fourth pressing points $P_1$ to $P_4$, as shown in FIG. 6A, and as shown in FIGS. 7A to 7C, includes a highly rigid member 211, extending in a substantially "X"-shaped configuration on diagonal lines, and a low rigid member 212 mainly composed of remaining outer peripheral portions. The highly rigid member 211 is composed of material that is relatively hard with rubber hardness Hs equal to or greater than 50 and, in contrast, the low rigid member 212 is comprised of relatively soft material with rubber hardness Hs less than 50. The highly rigid member 211 has rigidity relatively higher than that of the low rigid member 212. The low rigid member 212 is formed with recesses, formed on the diagonal lines, to which the highly rigid member 211 is fitted and the highly rigid member 211 and the low rigid member 212 are joined to one another by vulcanizing adhesive into a unitized body. Incidentally, in the drawing figures, an inward direction of the battery 100 is designated by "IN" and an outward direction of the battery 100 is designated by "OUT".

Although no particular illustration is made in the drawing, the lower end plate 22a is similarly comprised of a highly rigid member extending in a substantially "X"-shaped configuration on diagonal lines and a low rigid member mainly composed of remaining outer peripheral portions such that rigidity at a pressing center Q becomes highest.

The end plates 21a, 22a with the structures set forth above, as shown in FIG. 7D, are set such that the degree of flexure is smallest at the pressing enter Q and the closer to the pressing center Q from the outer periphery, the less will be the degree of flexure to increase rigidity from the outer periphery toward the pressing center Q to allow the pressing center Q to have the maximum rigidity. Therefore, when the respective secondary batteries 10 of the module stack body 40 are applied with given surface pressures by means of the end plates 21a, 22a due to the rods 51 and nuts 52, distortions occurring on the end plates 21a, 22a can be minimized.

The end plates 21a, 22a have a capability in which dimensions "a" and "b" at a central area, near the pressing center Q, of the highly rigid member 211 and a width "c" of the diagonal portions of the highly rigid member 211 are expanded or contracted to adjust relative hardness of the highly rigid member 211 relative to the low rigid member 212 for thereby adjusting the degree (amount) "y" of flexure (see FIG. 7D) in the end plates 21a, 22a.

Incidentally, although increasing or decreasing thickness "d" of the highly rigid member 211 as shown in FIG. 7C may adjust the relative hardness of the highly rigid member 211 relative to the low rigid member 212, the presence of an increase in the thickness "d" results in an increase in a thickness of the upper end plate 21a followed by an increase in a volume and weight of the battery 100 per se.

As shown in FIG. 8, with a commonly used battery employing an end plate with a substantially equalized rigidity, a compression margin (length) L2 per one unit of each secondary battery falls in a value ranging from 0.1 to 0.18 [mm] due to thickness changes resulting from variations in thickness, thermal expansion and charging and discharging cycles of the secondary batteries, forming the battery, and in this moment, each secondary battery encounters a surface pressure P2 in a value ranging from $0.29 \times 10^{-1}$ to $4.9 \times 10^{-1}$ [MPa]. Such a surface pressure value involves a section that exceeds a value PE ranging from $0.49 \times 10^{-1}$ to $3.9 \times 10^{-1}$ [MPa] that is acceptable as a substantially equalized surface pressure.

On the contrary, as shown in the same drawing figure, with the battery 100 of the presently filed embodiment employing the end plate 21a, 22a whose rigidity increases toward the pressing center Q, a compression margin (length) L1 per one unit of the secondary battery 10 falls in a value ranging from 0.117 to 0.15 [mm] and in this moment, each secondary battery encounters a surface pressure $P_1$ in a value ranging from $0.78 \times 10^{-1}$ to $2.05 \times 10^{-1}$ [MPa]. Such a surface pressure value takes a value adequately involved in the allowable range PE for the substantially equalized surface pressure and the surface pressures to be applied to the plural secondary batteries 10, which forms the battery 100, are equalized, achieving long operating life of the secondary batteries.

In the meantime, with the end plates, each of which has the maximum rigidity at the pressing point Q as set forth above, not only the material may be modified like in the first embodiment, but also rigidities of the end plates may be changed like in second to fourth embodiments which will be described below. Also, batteries of the second to fourth embodiments are similar in structure to the first embodiment except for the structures of the end plates. Moreover, while the second to fourth embodiments will be described with reference only to an upper end plate, it will be appreciated that a lower end plate also takes a similar structure. Hereunder, with a focus on such a difference, the same component parts bear like reference numerals and description is made in a suitably omitted form or in a simplified form.

Second Embodiment

Next, a battery of a second embodiment according to the present invention is described below in detail with reference to FIGS. 9A to 9D.

FIG. 9A is a plan view illustrating an upper end plate of the battery of the presently filed embodiment; FIG. 9B is a front view of the plate of the battery of the presently filed embodiment; FIG. 9C is a side view of the plate of the battery of the presently filed embodiment; FIG. 9D is a graph illustrating the degree (amount) "y" of flexure of the upper end plate of the battery of the presently filed embodiment. Incidentally, in the drawing figures, an inward direction of the battery 100 is designated by "IN" and an outward direction of the battery 100 is designated by "OUT".

As shown in FIGS. 9A to 9C, the upper end plate 21b of the presently filed embodiment is set such that a thickness T1 at a pressing center Q is relatively thicker than a thickness T2 of an outer peripheral portion (as expressed as T1>T2).

With such a structure, the degree (amount) "y" of flexure is set to be minimum at the pressing center Q as shown in FIG. 9D and a rigidity of an upper end plate 21b takes the maximum value at the pressing center Q.

Incidentally, when stacking the upper end plate 21b onto the uppermost layer of the module stack body 40, the upper end plate 21b is stacked with a surface, varying in a wall thickness, placed outward.

Third Embodiment

Next, a battery of a third embodiment according to the present invention is described below in detail with reference to FIGS. 10A to 10D.

Figure 10A:
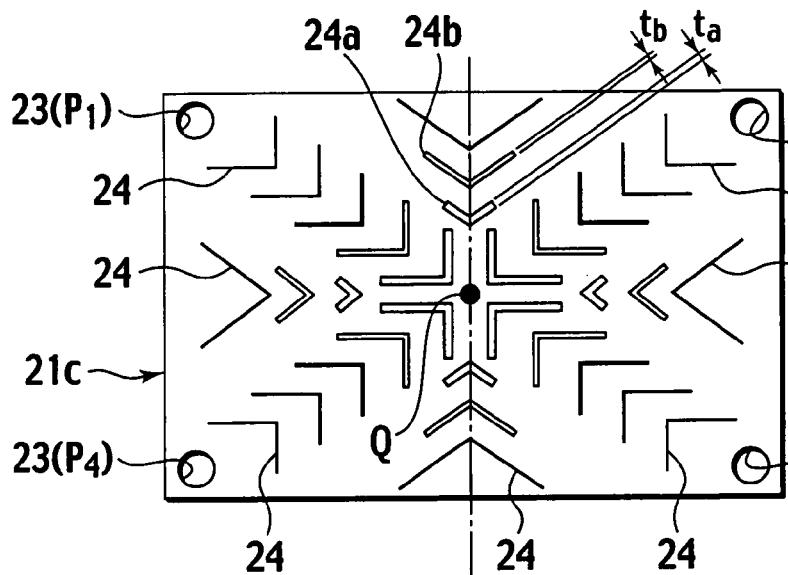
FIG. 10A is a plan view showing an upper end plate of a battery of a third embodiment according to the present invention.
Figure 10B:
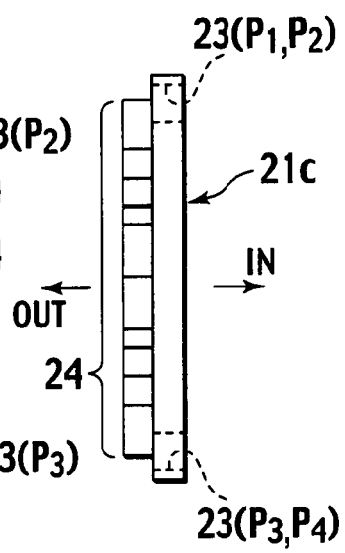
FIG. 10B is a front view of the plate of the battery of the presently filed embodiment.
Figure 10C:
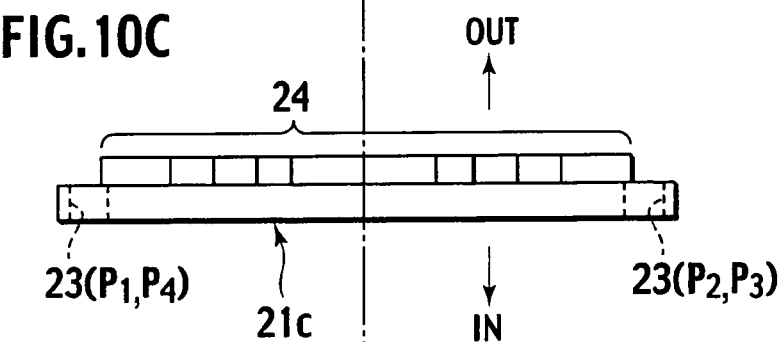
FIG. 10C is a side view of the plate of the battery of the presently filed embodiment.
Figure 10D:
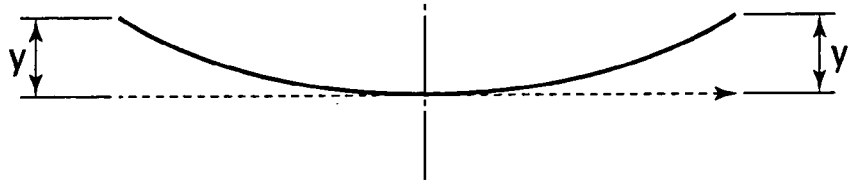
FIG. 10D is a graph showing the degree (amount) "y" of flexure of the upper end plate of the battery of the presently filed embodiment.

FIG. 10A is a plan view illustrating an upper end plate of the battery of the presently filed embodiment; FIG. 10B is a front view of the plate of the battery of the presently filed embodiment; FIG. 10C is a side view of the plate of the battery of the presently filed embodiment; and FIG. 10D is a graph illustrating the degree (amount) "y" of flexure of the upper end plate of the battery of the presently filed embodiment. Incidentally, in the drawing figures, an inward direction of the battery 100 is designated by "IN" and an outward direction of the battery 100 is designated by "OUT".

As shown in FIGS. 10A to 10C, the upper end plate 21c is formed with a plurality of substantially "L"-shaped ribs 24, protruding upward in a direction perpendicular to a surface of the end plate 21c, which are formed on diagonal lines and substantially intermediate lines between the adjacent diagonal lines (i.e., on line segments passing through a cross point of the diagonal lines to be substantially parallel to long sides and short sides of the end plate 21c) in a symmetric relationship with respect to the diagonal lines and the substantially intermediate lines as viewed on a plane. Also, as shown in FIG. 10A, the upper end plate 21c is set such that the closer to the pressing center Q, the greater will be the thickness of the ribs 24 and a density of the ribs 24 has the maximum value in an area close proximity to the pressing center Q whereby a thickness ta of the ribs 24a, closer to the pressing center Q, is relatively greater than a thickness tb of the ribs 24b disposed in an outward peripheral area (as expressed ta>tb).

With such a structure, as shown in FIG. 10D, the degree (amount) "y" of flexure at the pressing center Q lies at a minimum value and a rigidity at the pressing center Q of the upper end plate 21c lies at the maximum value.

Incidentally, when stacking the upper end plate 21c onto the uppermost layer of the module stack body 40, the upper end plate 21c is stacked with a surface, formed with the ribs 24, placed outward.

Fourth Embodiment

Next, a battery of a fourth embodiment according to the present invention is described below in detail with reference to FIGS. 11A to 11F.

Figure 11A:
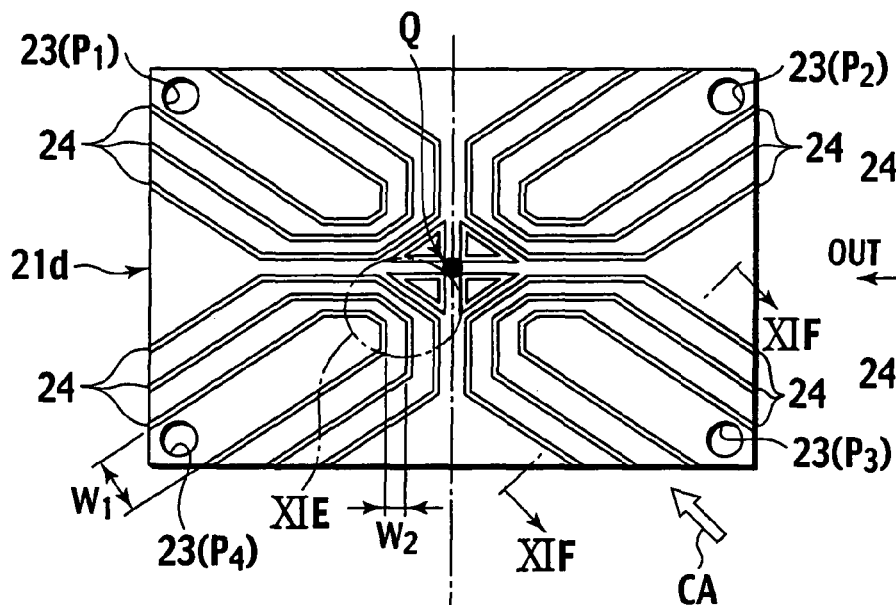
FIG. 11A is a plan view showing an upper end plate of a battery of a fourth embodiment according to the present invention.
Figure 11B:
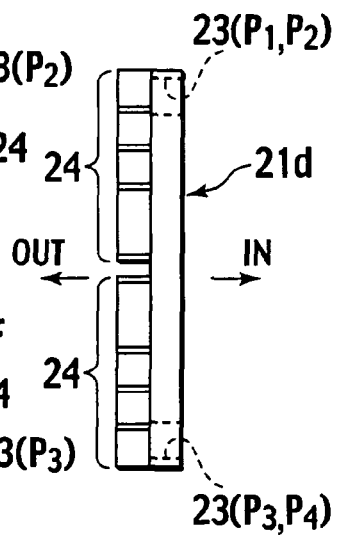
FIG. 11B is a front view of the plate of the battery of the presently filed embodiment.
Figure 11C:
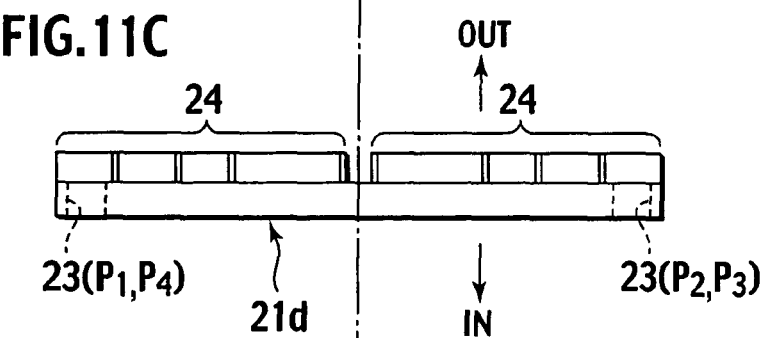
FIG. 11C is a side view of the plate of the battery of the presently filed embodiment.
Figure 11D:
FIG. 11D is a graph showing the degree (amount) "y" of flexure of the upper end plate of the battery of the presently filed embodiment.
Figure 11E:
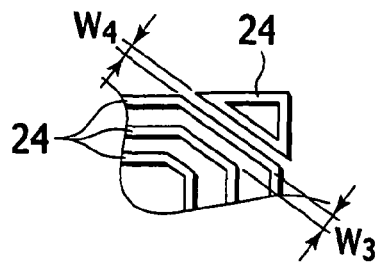
FIG. 11E is an enlarged view of a section XIE in FIG. 11A.
Figure 11F:
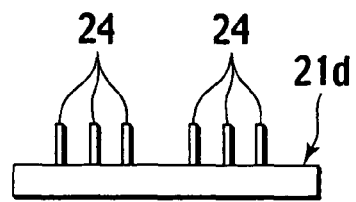
FIG. 11F is a cross-sectional view taken on line XIF-XIF of FIG. 11A.

FIG. 11A is a plan view illustrating an upper end plate of the battery of the presently filed embodiment; FIG. 11B is a front view of the plate of the battery of the presently filed embodiment; FIG. 11C is a side view of the plate of the battery of the presently filed embodiment; FIG. 11D is a graph illustrating the degree "y" of flexure of an upper end plate of the battery of the presently filed embodiment; FIG. 11E is an enlarged view of a section XIE of FIG. 11A; and FIG. 11F is a cross-sectional view taken on line XIF-XIF of FIG. 11A. Incidentally, in the drawing figures, an inward direction of the battery 100 is designated by "IN" and an outward direction of the battery 100 is designated by "OUT".

As shown in FIGS. 11A to 11C, 11E and 11F, the upper end plate 21d of the presently filed embodiment has multiple layers of ribs 24, protruding upward in a direction perpendicular to a surface of the end plate 21d, which are formed in succession to start from an outer peripheral edge portion and return to the same such that the ribs 24 extend from the outer peripheral edge portion toward a pressing center Q and turns at the pressing center Q to return to the outer peripheral edge portion again along diagonal lines. In such a way, the multiple layers of ribs 24 are deployed on line segments parallel to the respective diagonal lines extending from the pressing center Q. Incidentally, a set of four ribs 24, each shaped in a triangular form, are formed around the pressing center Q so as to surround the same.

As shown in FIGS. 11A and 11E, the ribs 24, the multiple layers 24, with such a structure, are formed such that distances $W_1$, $W_2$, $W_3$, $W_4$ between adjacent ribs 24 relatively decrease from an outer peripheral side toward the pressing center Q in terms of reference of W1 (as expressed as $W_1 > W_2 > W_3 > W_4$) whereby densities of the ribs 24 are determined to be highest in the vicinity of the pressing center Q.

With such a structure, as shown in FIG. 11D, the upper end plate 21d is set such that the degree (amount) "y" of flexure at the pressing center Q has the minimum value and rigidity at the pressing center Q has the maximum value.

Incidentally, when stacking the upper end plate 21d onto the uppermost layer of the module stack body 40, the upper end plate 21d is stacked with a surface, formed with the ribs 24, placed outward.

Further, with the presently filed embodiment, as shown in FIG. 11A, under circumstances where a fan (not shown) is used to blow out a cooling air CA for cooling the respective secondary batteries 10 forming the battery 100, the presence of the cooling wind passing across the ribs 24 of the upper end plate 21d makes it possible to decrease the variation in temperature distributions of the secondary batteries.

In cases where a passage in a portion with a clearance $W_4$, which is narrowest, is supposed to have a cross sectional surface area of $\alpha$ [m$^2$] and a clearance $W_3$ in the second narrow place is approximately expressed as $W_3=1.5 \times W_4$, a passage in a portion with the clearance $W_3$ has a cross-sectional surface area of approximately $2.25 \times \alpha$ [m$^2$]. In addition, under circumstances where the cooling wind is blown out to the upper end plate 21d at a constant flow rate of V [m$^3$/min], the cooling wind passing across the portion of the clearance $W_3$ has a wind velocity of V/60 $\alpha$ [m/s] and, in contrast, a wind velocity at the passage in the portion of the clearance $W_4$ reaches a value of V/135 $\alpha$ [m/s].

Accordingly, the upper end plate 21d can be set such that the closer to the pressing point Q, the faster will be the wind speed whereby a heat, built up at the central portion Q, can be effectively cooled and the temperature distributions of the secondary batteries can be equalized.

Thus, the battery 100, whose surface pressures, related to the respective embodiments set forth above, are equalized to minimize a drop in outputs of the secondary batteries, can be appropriately installed on vehicles, such as electric automobiles, as a suitable power supply for a prime mover.

Figure 12:
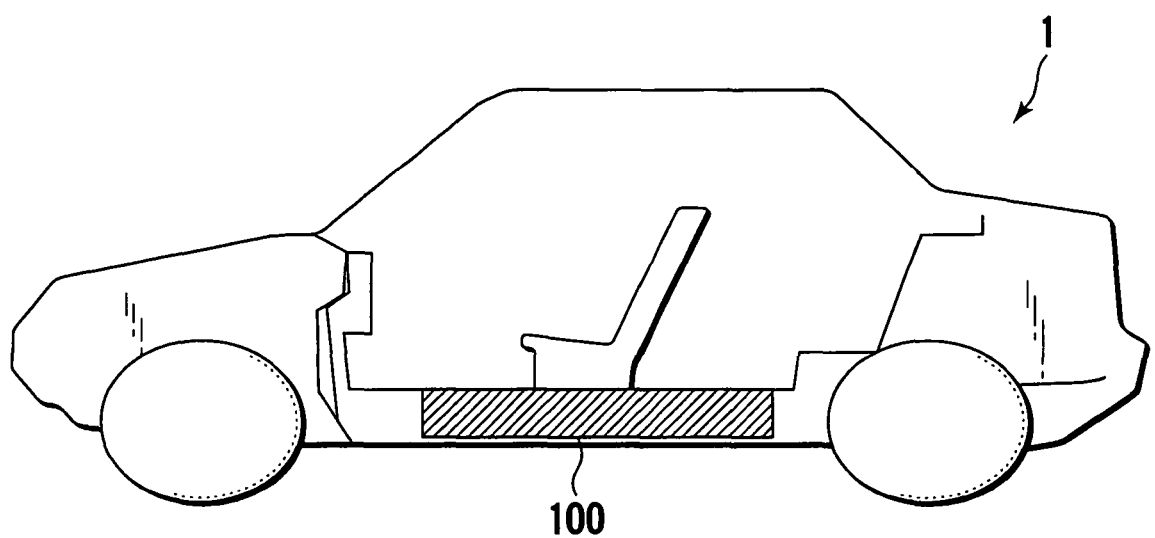
FIG. 12 is a typical view of showing a vehicle in which the battery of each embodiment according to the present invention is installed.

FIG. 12 is a typical view showing a vehicle installed with the battery of each embodiment according to the present invention.

As shown in FIG. 12, the batteries 100 of the first to fourth embodiments can be installed in the vehicle 1 underneath a floor thereof.

As set forth above, with the battery of the respective embodiments according to the present invention, the end plate is set to have the maximum rigidity at the pressing center at which the end plate is apt to become distorted due to pressing while the rigidity at the pressing point is made relatively higher than those of areas other than pressing center. This results in the suppression of the distortion occurring in the pressing center of the end plate when given pressures are applied to the respective secondary batteries of the module stack body via the end plates by means of the bolts and nuts. Thus, the surface pressures applied to the respective secondary batteries of the module stack body can be equalized, making it possible to minimize drops in output voltages of the secondary batteries.

Incidentally, with the various embodiments set forth above, while one sub module is formed of the ninth secondary batteries and eleven stages of these sub modules are stacked to allow the total of ninety-nine (9×11) secondary batteries to be connected in series to form the battery, the present invention is not limited to such a structure and an alternative may be possible wherein one sub module is formed of n-pieces of secondary batteries and M-stages of these sub modules are stacked such that a total of N×M pieces of secondary batteries are connected in series to arbitrarily form a battery (any of M and N represents a natural number).

Furthermore, with the various embodiments set forth above, while the secondary batteries are connected in series but the present invention is not limited to such particular connection. It is of course to be possible to provide a battery in which respective secondary batteries are arbitrarily connected in series, in parallel or in compositely series and parallel to provide a desired capacity and output voltage.

Also, with the various embodiments set forth above, while both rigidities of a pair of plate-like members disposed on the uppermost and lowermost layers of the battery stack body, it may be sufficed for the rigidity of only one of the plate-like members to be adjusted if desired.

The entire content of a Patent Application No. TOKUGAN 2004-068870 with a filing date of Mar. 11, 2004 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A battery comprising:
   a battery stack body including a plurality of stacks of secondary batteries in each of which electrode plates, stacked via a separator, are accommodated and sealed in an outer sheath member, with electrode terminals correspondingly connected to the electrode plates and extracted from an outer peripheral edge of the outer sheath member;
   a pair of plate-like members, stacked as outermost layers of the battery stack body, respectively, so as to be opposed to each other; and a pressing mechanism pressing the plurality of secondary batteries via the pair of plate-like members with at least four pressing points, wherein at least one of the pair of plate-like members has a characteristic exhibiting a highest rigidity at a pressing center thereof determined based on a plurality of pressing points of the at least one of the pair of plate-like members that are pressed by the pressing mechanism, wherein the at least one of the pair of plate-like members is formed with a plurality of ribs, wherein the at least one of the pair of plate-like members is configured to provide a cooling flow across a space between the plurality of ribs so as to cool the secondary batteries, and wherein the plurality of ribs are formed in clearance pattern such that the closer to the pressing center, the smaller will be a clearance of the plurality of ribs.

2. The battery according to claim 1, wherein the plurality of ribs protrude in a direction perpendicular to a surface of the at least one of the pair of the plate-like members.

3. The battery according to claim 1, wherein the plurality of ribs are formed in a layout pattern such that the closer to the pressing center, the greater will be a layout density of the plurality of ribs and the layout density has a maximum value in the vicinity of the pressing center.

4. The battery according to claim 1, wherein the clearance of the plurality of ribs has a minimum value in the vicinity of the pressing center.

5. The battery according to claim 1, wherein each of the plurality of ribs is located on a diagonal lie or a line segment parallel to a side of the at least one of the pair of plate-like members to have a configuration symmetrical with respect to the diagonal lie or the line segment parallel to the side of the at least one of the pair of plate-like members.

6. The battery according to claim 1, wherein each of the plurality of ribs has a configuration that extends from a peripheral edge portion toward the pressing center on a surface of the at least one of the pair of plate-like members and turn at the pressing center to return to the peripheral edge portion.

7. The battery according to claim 1, wherein the outer sheath member includes a synthetic resin layer, made of synthetic resin material, and a metallic layer made of metal material.

8. The battery according to claim 1, wherein the electrode plates include a positive electrode plate that has a positive electrode active material containing at least one of lithium-manganese-family composite oxides, lithium-nickel-family composite oxides and lithium-cobalt-family composite oxides.

9. The battery according to claim 1, wherein the electrode plates includes a negative electrode plate that has a negative electrode active material that contains at least one of crystalline carbon and amorphous carbon.

10. The battery according to claim 1, wherein the plurality of secondary batteries are electrically connected in at least one of series connection and parallel connection to one another to form a sub module.

11. A battery comprising:
a battery stack body including a plurality of stacks of secondary batteries in each of which electrode plates, stacked via a separator, are accommodated and sealed in an outer sheath member, with electrode terminals correspondingly connected to the electrode plates and extracted from an outer peripheral edge of the outer sheath member;
a pair of plate-like members, stacked as outermost layers of the battery stack body, respectively, so as to be opposed to each other; and
pressing means for pressing the plurality of secondary batteries via the pair of plate-like members with at least four pressing points,
wherein at least one of the pair of plate-like members has a characteristic such that a pressing center of the at least one of the pair of plate-like members has a highest rigidity at a pressing center thereof determined based on a plurality of pressing points of the at least one of the pair of plate-like members that are pressed by the pressing means, wherein the at least one of the pair of plate-like members is formed with a plurality of ribs, wherein the at least one of the pair of plate-like members is configured to provide a cooling flow across a space between the plurality of ribs so as to cool the secondary batteries, and wherein the plurality of ribs are formed in a clearance pattern such that the closer to the pressing center, the smaller will be a clearance of the plurality of ribs.

12. The battery according to claim 1, wherein the pressing center is located in a center of the at least one of the pair of plate-like members.

13. The battery according to claim 11, wherein the pressing center is located in a center of the at least one of the pair of plate-like members.

* * * * *